L. BELLINGHAM.
MEANS FOR DETECTING THE PRESENCE AT A DISTANCE OF ICEBERGS, STEAMSHIPS, AND OTHER COLD OR HOT OBJECTS.
APPLICATION FILED MAY 1, 1913.
1,158,967.
Patented Nov. 2, 1915.
2 SHEETS—SHEET 1.
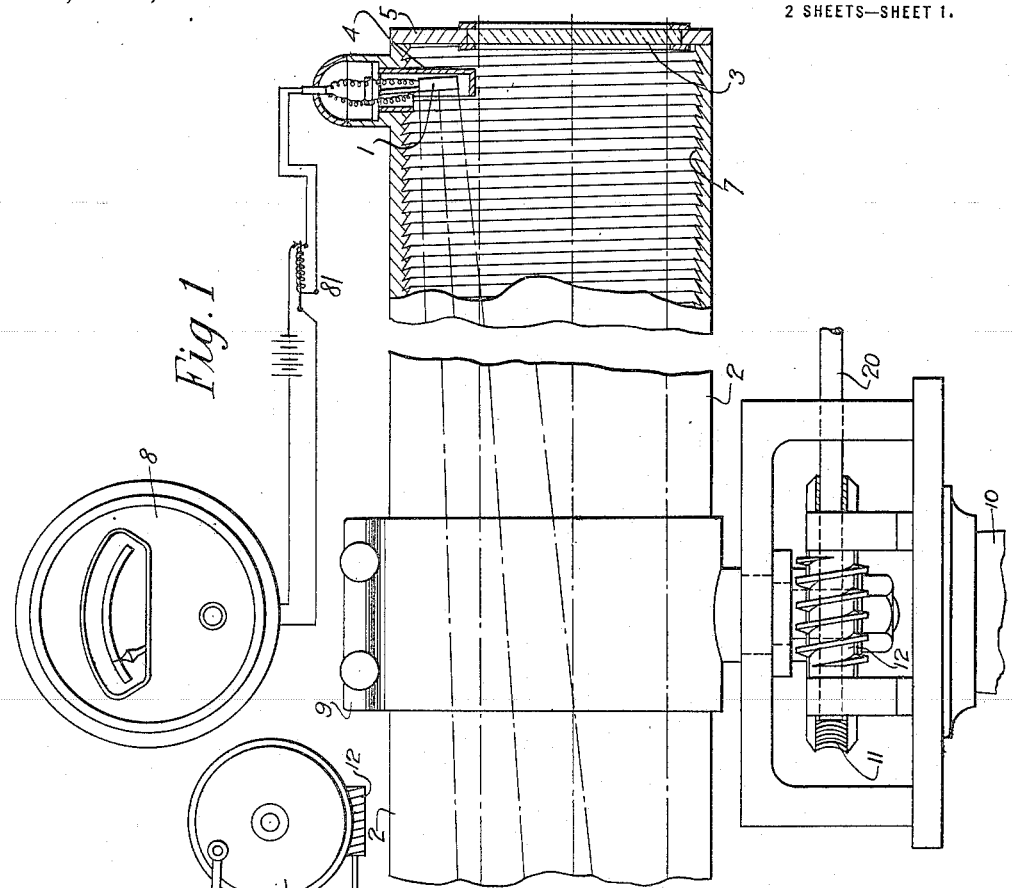
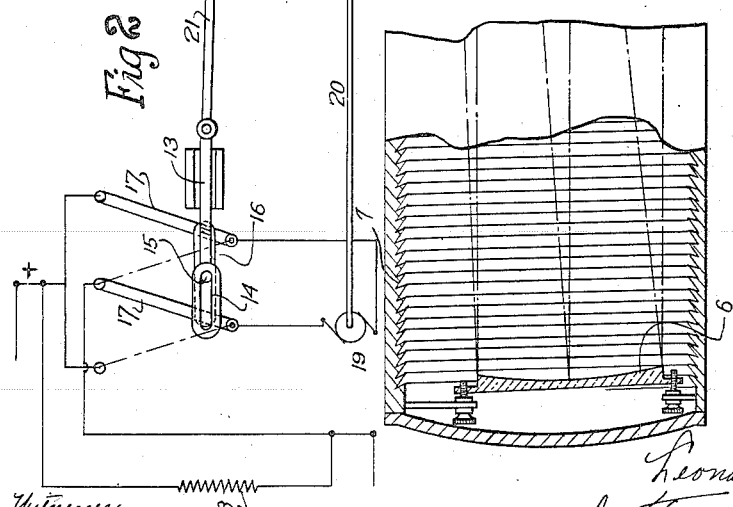

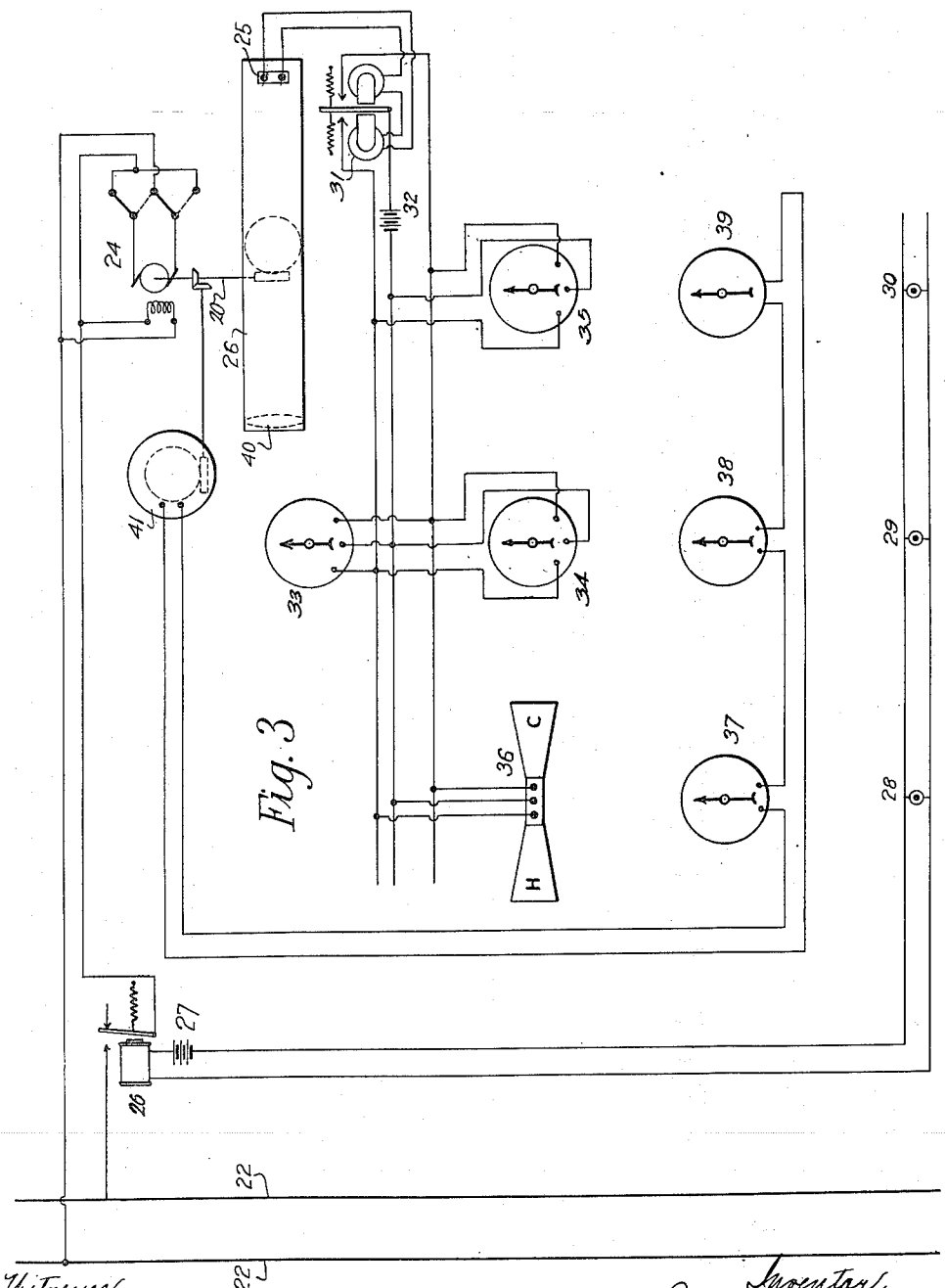

UNITED STATES PATENT OFFICE.

LEONARD BELLINGHAM, OF TUNBRIDGE WELLS, ENGLAND.

MEANS FOR DETECTING THE PRESENCE AT A DISTANCE OF ICEBERGS, STEAMSHIPS, AND OTHER COLD OR HOT OBJECTS.

1,158,967. Specification of Letters Patent. Patented Nov. 2, 1915.

Application filed May 1, 1913. Serial No. 764,893.

*To all whom it may concern:*

Be it known that I, LEONARD BELLINGHAM, a subject of the King of the United Kingdom of Great Britain and Ireland, residing at 17 Mountfield Gardens, Tunbridge Wells, England, have invented new and useful Improvements in Means for Detecting the Presence at a Distance of Icebergs, Steamships, and other Cold or Hot Objects, of which the following is a specification.

This invention relates to apparatus for detecting the presence at a distance of icebergs, steamships and the like, and, in particular, to arrangements on a ship of a radiation-receiver sensitive to radiations of long infra-red wave-lengths, such as a thermopile or bolometer for example, said radiation-receiver being directed toward the region which it is desired to search. The radiation-receiver which I employ is hereinafter termed an "infra-red eye."

The invention consists in particular forms of apparatus comprising an infra-red eye, as hereinafter described and claimed.

Masses of ice sufficiently large to constitute a source of danger to a ship traveling toward them will cause large deflections in one direction while the presence of warmer bodies in the region exposed, such as steamships, torpedo boats or the like will be indicated by deflections in the reverse direction.

The precise direction of the iceberg, steamship or the like can be ascertained to whatever accuracy may be desired, either, for instance by providing the infra-red eye with automatic means for imparting to it slow horizontal oscillating motion and by an indicator being provided with means for indicating at each instant the direction in which the infra-red eye is directed, or, for example, by the observer systematically searching by means of the infra-red eye, the latter preferably being mounted revolubly about a vertical axis and means for directing the infra-red eye from a distance being provided if desired. The infra-red eye may, however, be fixed to look straight ahead of the ship, its field of view being arranged to cover the whole danger zone, or it may be revoluble about both a horizontal and a vertical axis.

In order to increase the precision with which the direction of the iceberg, or the like can be located the infra-red eye is preferably placed in the focal plane of a mirror or of a lens constructed of one or more materials transparent to the radiations in question, such materials as rock salt for instance, potassium chlorid, either in its natural crystalline form of sylvin or otherwise.

In order that the invention may be clearly understood one form of apparatus according to the invention is illustrated in the accompanying drawing, in which:—

Figure 1 shows in part sectional elevation a tube fitted with a mirror and with an infra-red eye in the focal plane of the same and an indicator connected with said infra-red eye, and Fig. 2 a diagram of electric and mechanical means for oscillating the infra-red eye and Fig. 3 a diagram of a complete installation.

The infra-red eye 1 which in this case is a thermopile is mounted laterally in a tube 2 preferably of stout copper and of a diameter of about 10 inches for example, and near the window end of the same. The window 3 may have a diameter of about 6 inches and consists of a material transparent to infra-red radiations. The infra-red eye is prevented from directly receiving the radiation in question by being shielded by a shield 4 and by being mounted close behind the opaque portion of the mount 5 containing said window. At the other end of the tube there is arranged a mirror 6 which is preferably of copper the reflecting surface being gilt. The reflecting surface of the mirror 6 is supposed to be toroidal, the toroidal surface being of such curvatures in the vertical and horizontal planes respectively as to produce on the sensitive surface of the thermopile a sharply localized image in a horizontal plane, the rays in the vertical plane on the other hand being distributed over an angle of from several degrees below to several degrees above the horizontal, the object being to prevent loss of the image by pitching of the ship when the apparatus is in use at sea. The precise angle in a vertical plane which it is desirable to cover is determined by the dimensions and construction of the vessel. The entire surface of the inside of the tube is cut with a small angled screw-thread 7, the angle of the thread being small and the thread sloping toward the window of the tube so as to absorb all radiations entering the tube other than those of objects lying along its axis. The surface is further so chemically treated as to reflect as little as possible the radiations in question. For instance, I may apply to the surface a solution of copper sulfate and silver nitrate and subsequently heat the same to obtain copper oxid.

The relays and indicators are preferably made to be free from influence by mechanical vibrations or stray magnetic fields and they may be situated in any part of the ship irrespective of the location of the infra-red eye, which is preferably situated at a height on the fore-mast or in any suitable elevated position preferably toward the front of the vessel. In the drawing 8 is an indicator electrically connected through the relay 81 with the infra-red eye 1. When an iceberg is sighted the needle will be deflected to one side of the zero mark and when a steamship is sighted to the other side. The direction in which the iceberg or steamship is located may be indicated by an engine room telegraph or the like mounted near the indicator and indicating continuously the direction in which the tube of the infra-red eye is pointing.

Several indicators may be operated from one infra-red eye, one indicator being on the bridge for example, and another in the engine room or other convenient place and said indicators may be provided with means for giving audible signals.

In the example illustrated the tube containing the infra-red eye is mounted in a revoluble clamp 9 at the top of a pillar 10. A worm wheel 11 is mounted on the vertical pivot of the clamp and said worm wheel is capable of being turned by the worm 12 on the spindle 20 which may be operated by hand or by means of an electric motor. When an electric motor is employed the electrical and mechanical connections illustrated in Fig. 2 may be adopted. In this figure, 11 is the worm-wheel, 21 a connecting rod and 13 a slide rod, which is provided with a slot 14 which engages with a pin 15 on a bridge 16 interconnecting the switch arms 17, 17. The electric connections are evident by an inspection of the figure, 18 being the motor field coils and 19 the motor armature. While the switch is in the position illustrated in full lines the current flows through the armature in the one direction and while in the position indicated in dotted lines in the other direction. By virtue of these connections it is clear that an oscillating motion through a given angle is imparted to the worm wheel 11 and consequently to the tube carrying the infra-red eye, it being understood that the armature of the motor has sufficient inertia to carry the switch arms completely over in both directions. The complete period of one oscillation may be one minute.

Referring now to the complete installation shown diagrammatically by way of example in Fig. 3, 22, 22 are the mains, 24 means for automatically oscillating the infra-red eye 25 fitted in the tube 26 in the focal plane of the lens 40, said means 24 being supposed to be the same as those shown in Fig. 2. 261 is a relay switch in the circuit of said means 24 which relay switch can be operated by hand or by the battery 27 in the circuit of the pushes 28, 29, 30. The infra-red eye 25 is connected with the polarized relay 31 which comprises an armature controlled on each side by springs and which by means of the battery 32 operates the indicators 33, 34, 35 and the double electric horn 36 which produces two notes, to differentiate the presence of a cold body from that of a hot body. Similarly a deflection toward H on the indicators indicates a hot body and a deflection toward C a cold body. 37, 38, 39 are engine room telegraphs or similar instruments for indicating the direction at each instant of the infra-red eye tube 26, 41 being the transmitter for actuating these instruments which is operated from said tube or from the mechanism which oscillates said tube. Pairs of similar bevel gears, worms, and worm wheel are diagrammatically shown as examples of the means, operated by the means 24, for producing synchronous angular movements of the tube 26 and the transmitter 41. The instruments 36, 37 and 28 may be located close together on the bridge for example and the instruments 34, 38 and 29 in the engine room and instruments 35, 39 and 30 elsewhere. 33 is located close to the tube 26.

What I claim as my invention and desire to secure by Letters Patent is:—

1. In apparatus for detecting the presence at a distance of icebergs, steamships and the like, a tube, a mirror in said tube, and a thermopile sensitive to radiations of long infra-red wave-lengths arranged in said tube and in the focal plane of said mirror.

2. In apparatus for detecting the presence at a distance of icebergs, steamships and the like, a tube, a toroidal mirror in said tube, and a radiation-receiver sensitive to radiations of long infra-red wave-lengths arranged in said tube and in the focal plane of said mirror.

3. In apparatus for detecting the presence at a distance of icebergs, steamships and the like, a tube, a toroidal copper mirror having a gilt reflecting surface in said tube, and a radiation-receiver sensitive to radiations of long infra-red wave-lengths arranged in said tube and in the focal plane of said mirror.

4. In apparatus for detecting the presence at a distance of icebergs, steamships and the like, a tube having on its internal surface a small angled screw-thread the threads of which slope toward the end nearer the object to be detected, radiation focusing means in said tube, and a radiation receiver sensitive to radiations of long infra-red wave-lengths arranged in said tube and in the focal plane of said focusing means.

5. In apparatus for detecting the presence at a distance of icebergs, steamships and the like, a tube provided near one end with a screen having a window and a radiation-receiver behind said screen and provided near the other end with a mirror.

6. In apparatus for detecting the presence at a distance of icebergs, steamships and the like, a tube provided near one end with a screen having a window of a material transparent to infra-red radiations, and a radiation-receiver behind said screen and provided near the other end with a mirror.

7. In apparatus for detecting the presence at a distance of icebergs, steamships and the like, a revoluble tube provided near one end with a screen having a window and a thermopile behind said screen and provided near the other end with a mirror.

8. In apparatus for detecting the presence at a distance of icebergs, steamships and the like, a tube having a window at one end thereof, a mirror in said tube near the other end thereof, and a radiation receiver sensitive to radiations of long infra-red wave-lengths arranged in said tube and in the focal plane of said mirror, the interior surface of said tube being in the form of a small angled thread sloping toward said window.

9. In apparatus for detecting the presence at a distance of icebergs, steamships and the like, a tube which is provided near one end with a screen having a window and near the other end with a mirror, and a radiation receiver arranged behind said screen and laterally with respect to said window.

10. In apparatus for detecting the presence at a distance of icebergs, steamships and the like, a tube provided near one end with a screen having a window and a radiation - receiver behind said screen and provided near the other end with a mirror, and a shield located between said radiation-receiver and said window.

In testimony whereof I have signed my name to this specification in the presence of two subscribing witnesses.

LEONARD BELLINGHAM.

Witnesses:
O. J. WORTH,
W. E. ROGERS.